United States Patent
Humfeld et al.

(10) Patent No.: US 10,801,836 B2
(45) Date of Patent: Oct. 13, 2020

(54) COMPOSITE PARTS THAT FACILITATE ULTRASONIC IMAGING OF LAYER BOUNDARIES

(71) Applicant: The Boeing Company, Chicago, IL (US)

(72) Inventors: Keith D. Humfeld, Federal Way, WA (US); Morteza Safai, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 339 days.

(21) Appl. No.: 15/621,900

(22) Filed: Jun. 13, 2017

(65) Prior Publication Data

US 2018/0356215 A1    Dec. 13, 2018

(51) Int. Cl.
| | | |
|---|---|---|
| *B29C 70/30* | (2006.01) | |
| *G01B 17/02* | (2006.01) | |
| *G01N 29/07* | (2006.01) | |
| *C08J 5/04* | (2006.01) | |
| *B29C 70/38* | (2006.01) | |
| *G01N 29/06* | (2006.01) | |

(Continued)

(52) U.S. Cl.
CPC ............ *G01B 17/02* (2013.01); *B29C 70/025* (2013.01); *B29C 70/386* (2013.01); *B29C 70/54* (2013.01); *C08J 5/04* (2013.01); *C08J 5/042* (2013.01); *G01N 29/0654* (2013.01); *G01N 29/07* (2013.01); *G01N 29/11* (2013.01); *B29C 70/30* (2013.01); *B29C 70/38* (2013.01); *B29K 2995/0046* (2013.01); *B29K 2995/0082* (2013.01); *C08K 2201/011* (2013.01); *G01N 29/04* (2013.01); *G01N 2291/011* (2013.01); *G01N 2291/015* (2013.01); *G01N 2291/0231* (2013.01); *G01N 2291/0235* (2013.01); *G01N 2291/02854* (2013.01)

(58) Field of Classification Search
CPC .......... B29C 70/42; B29C 70/30; B32B 37/24
USPC ....................................... 156/279
See application file for complete search history.

(56) References Cited

U.S. PATENT DOCUMENTS

| | | | | |
|---|---|---|---|---|
| 4,783,506 | A | * | 11/1988 | Gawin ................. C08G 59/226 525/109 |
| 4,957,801 | A | * | 9/1990 | Maranci ............... B29C 70/086 428/147 |

(Continued)

OTHER PUBLICATIONS

Kaczmarek, H., Ultrasonic Detection of Damage in CFRPs, Journal of Composite Materials, vol. 29, No. 1 (1995), pp. 59-95. (Year: 1995).*

(Continued)

*Primary Examiner* — Matthew J Daniels
(74) *Attorney, Agent, or Firm* — Duft & Bornsen, PC

(57) ABSTRACT

Systems and methods are provided for ultrasonic imaging of composite parts. One embodiment is a method that includes providing an object having multiple layers of fibers and resin, inducing ultrasonic waves at locations along the object, and attenuating the ultrasonic waves at the regions due to regions interspersed among the layers that each exhibit an elastic modulus distinct from an elastic modulus of the fibers and distinct from an elastic modulus of the matrix. The method further includes receiving the attenuated ultrasonic waves, and analyzing the attenuated ultrasonic waves to determine depths of the regions.

20 Claims, 9 Drawing Sheets

(51) Int. Cl.
*B29C 70/54* (2006.01)
*B29C 70/02* (2006.01)
*G01N 29/11* (2006.01)
*G01N 29/04* (2006.01)

(56) References Cited

U.S. PATENT DOCUMENTS

| | | | |
|---|---|---|---|
| 5,028,478 A * | 7/1991 | Odagiri | C08J 5/24 |
| | | | 428/327 |
| 5,789,073 A * | 8/1998 | Odagiri | C08J 5/24 |
| | | | 428/297.4 |
| 7,628,358 B2 | 12/2009 | Ackermann et al. | |
| 8,647,548 B1 | 2/2014 | Humfeld | |
| 2004/0230119 A1 | 11/2004 | Brustad et al. | |
| 2008/0295955 A1 * | 12/2008 | Cawse | B32B 5/22 |
| | | | 156/276 |
| 2009/0004460 A1 * | 1/2009 | Gruber | B82Y 30/00 |
| | | | 428/323 |
| 2009/0121051 A1 * | 5/2009 | Michael | B05B 5/0533 |
| | | | 239/706 |
| 2010/0178487 A1 * | 7/2010 | Arai | B32B 5/22 |
| | | | 428/300.1 |
| 2012/0107560 A1 * | 5/2012 | Rogers | B29C 70/025 |
| | | | 428/147 |
| 2014/0162518 A1 * | 6/2014 | Shimizu | C08J 5/24 |
| | | | 442/175 |
| 2015/0099091 A1 * | 4/2015 | Kurtz | B29C 70/345 |
| | | | 428/114 |
| 2016/0159998 A1 * | 6/2016 | Spencer | B29C 70/547 |
| | | | 156/286 |
| 2018/0229452 A1 * | 8/2018 | Ogale | B32B 37/16 |

OTHER PUBLICATIONS

Forest-Line TapeLay; Metal Cutting CAD software; Composites Products Composites Controls & Software Forest-Line TapeLay. U.S. Appl. No. 15/089,737.

* cited by examiner

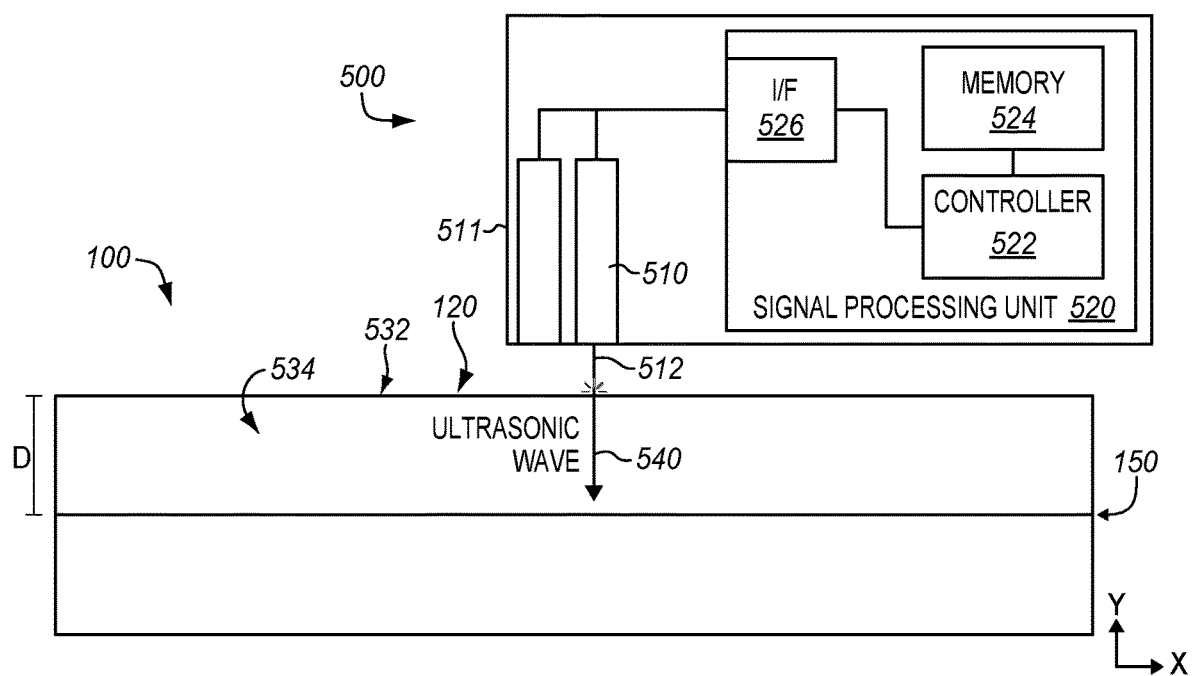
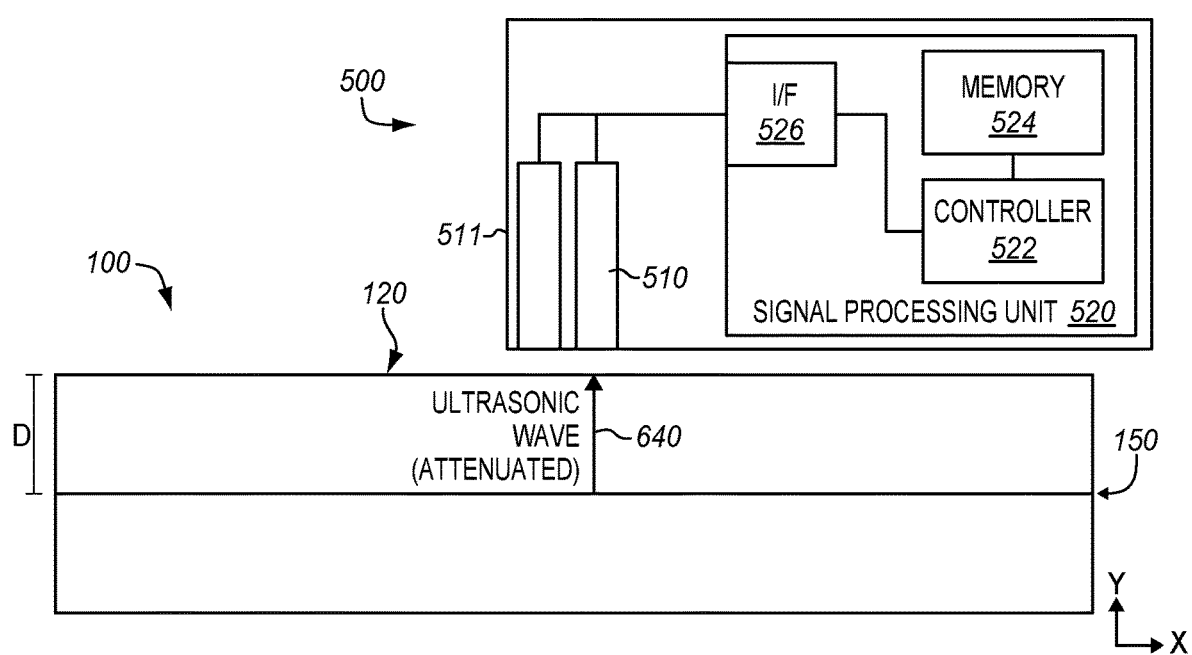

COMPOSITE PARTS THAT FACILITATE ULTRASONIC IMAGING OF LAYER BOUNDARIES

FIELD

The disclosure relates to the field of composite design, and in particular, to composite parts.

BACKGROUND

Composite parts, such as Carbon Fiber Reinforced Polymer (CFRP) parts, are initially laid-up in multiple layers that together form an unhardened laminate. Individual fibers within each layer of the laminate are aligned parallel with each other, but different layers may exhibit different fiber orientations in order to increase the strength of the resulting composite part along different dimensions. The laminate may include an unhardened (e.g., viscous semisolid) resin that hardens at increased temperature in order to harden the laminate into a composite part (e.g., for use in an aircraft). For thermoset resins, the hardening is a one-way process referred to as curing, while for thermoplastic resins, the resin may return to an unhardened form if it is re-heated.

In order to ensure that composite parts exhibit an expected level of strength, it may be desirable to ensure that fibers within the composite parts do not exhibit inconsistencies such as curvature or bends in unexpected locations. However, composite parts are opaque and hence destructive testing is needed to check for internal inconsistencies because the current state of Non-Destructive Imaging (NDI) yields results that do not have a desired level of clarity. For example, destructive testing may involve removing a sample from a composite part, and visually inspecting intersections between layers of the sample for inconsistencies. In this manner, a technician may carefully cut the composite part to reveal internal sections thereof. This technique alters the structure of the composite part which is tested, and also quantifies only the portion of the composite part that is proximate to the sample.

Designers of composite parts continue to seek out enhanced techniques for imaging the internal composition of composite parts. Therefore, it would be desirable to have a method and apparatus that take into account at least some of the issues discussed above, as well as other possible issues.

SUMMARY

Embodiments described herein provide for enhanced composite parts that exhibit a substantially altered elastic modulus at a boundary between internal layers of fiber-reinforced material. For example, these composite parts may utilize internal pores or particles at the boundary to cause this change in elastic modulus. By causing a change in elastic modulus at the boundary, acoustic impedance of the composite part is altered at the boundary. This allows for high-contrast imaging of the boundary via ultrasound.

One embodiment is a method that includes providing an object having multiple layers of fibers and resin, inducing ultrasonic waves at locations along the object, and attenuating the ultrasonic waves at the regions due to regions interspersed among the layers that each exhibit an elastic modulus distinct from an elastic modulus of the fibers and distinct from an elastic modulus of the matrix. The method further includes receiving the attenuated ultrasonic waves, and analyzing the attenuated ultrasonic waves to determine depths of the regions.

A further embodiment is a method that includes laying up a layer of fiber-reinforced material comprising fibers and a matrix of unhardened resin, and interspersing material that is distinct from the fibers and the matrix onto a surface of the layer.

A further embodiment is a product that includes a composite part. The composite part includes layers of fiber-reinforced material, each of the layers contacting another of the layers. Each of the layers includes fibers and a matrix of hardened resin. The composite part also includes regions that are interspersed among the layers, and that have an elastic modulus that is distinct from an elastic modulus of the fibers and that is distinct from an elastic modulus of the matrix.

A further embodiment is a product that includes a laminate for hardening into a composite part. The laminate includes layers of fiber-reinforced material, each of the layers contacting another of the layers, each of the layers comprising fibers and a matrix of unhardened resin surrounding the fibers. The laminate also includes regions that are interspersed among the layers. Each region exhibits an elastic modulus distinct from an elastic modulus of the fibers and distinct from an elastic modulus of the matrix.

A further embodiment is an apparatus. The apparatus includes a Composite Tape Layup Machine (CTLM). The CTLM includes a head that lays up a fiber-reinforced layer of a laminate that comprises fibers and a matrix of unhardened resin, a dispenser that dispenses a material that is chemically distinct from the fibers and the matrix, and a controller that directs the dispenser to intersperse the material onto a layer being laid-up by the head.

Yet another embodiment is a method of inspecting a composite structure. The method includes laying up a composite structure of fibers and a matrix of resin. The method also includes interspersing, at a predetermined strategic location within the composite structure, a material that is distinct from the fibers and the resin. Furthermore, the method includes interrogating the composite structure via ultrasound, and imaging the predetermined strategic location of the material within the composite structure via the ultrasound inspection.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIGS. 5-6 are diagrams illustrating ultrasonic imaging of the enhanced composite part of FIG. 1A in an exemplary embodiment.

DESCRIPTION

Figure 1A:
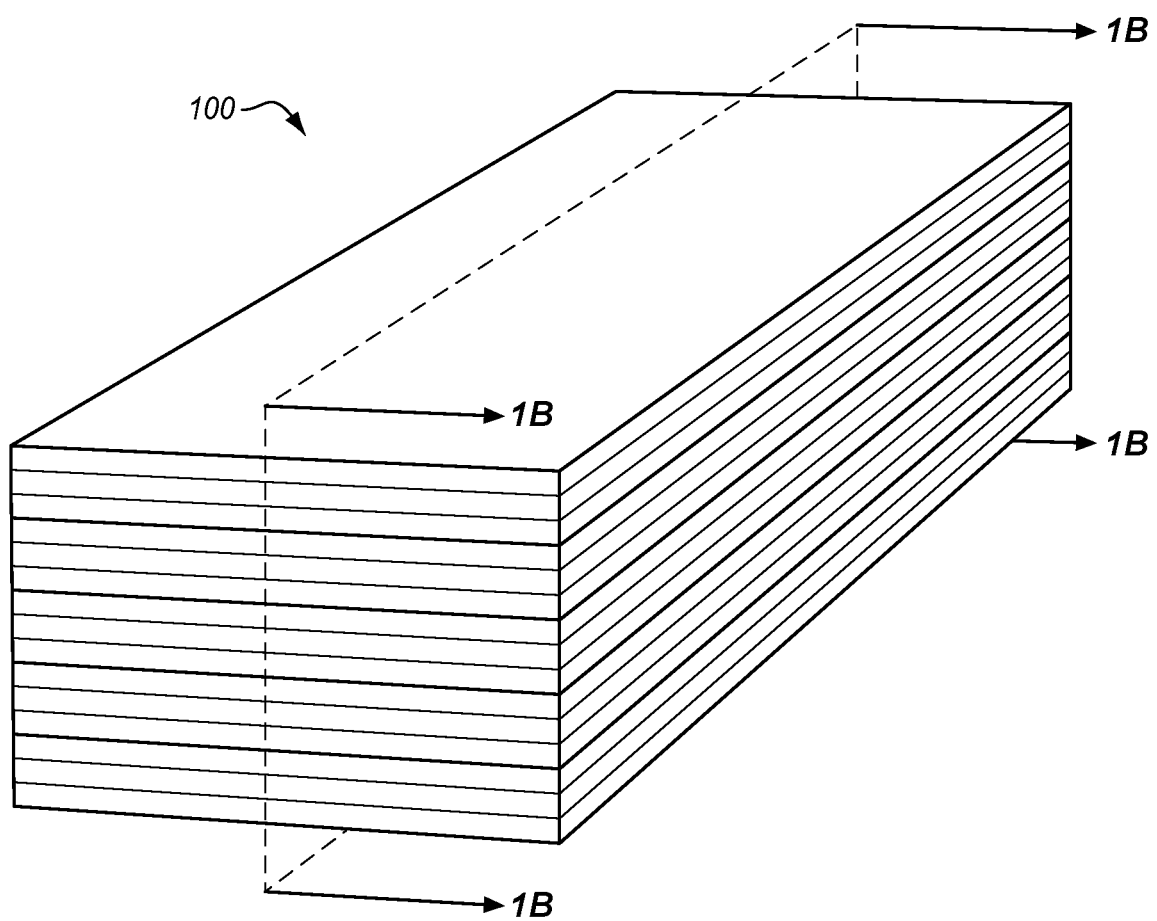
FIGS. 1-4 are diagrams illustrating a composite part that has been enhanced with high-strength particles at an intersection between layers of the composite part.

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The following FIGS. describe enhanced composite parts, as well as techniques and systems that utilize ultrasonic scanning/imaging in order to analyze the internal boundaries between layers of those parts.

FIGS. 1-4 are diagrams illustrating composite part 100 in an exemplary embodiment. Specifically, FIG. 1A illustrates a perspective view of composite part 100 in an exemplary embodiment, and FIG. 1B illustrates a side view of composite part 100 in an exemplary embodiment indicated by view arrows 1B of FIG. 1A. In this embodiment, composite part 100 includes layers 110, 112, 114, 116, and 118. Each layer includes a matrix 162 of hardened (e.g., cured, solid) resin, as well as fibers 164. In this embodiment, a boundary 150 between layers 114 and 116 has been altered by the inclusion of regions 170. Regions 170 exhibit a changed elastic modulus with respect to the elastic modulus of matrix 162 and fibers 164. This characteristic alters the acoustic impedance of composite part 100 at boundary 150, which enhances the quality of ultrasonic images taken of boundary 150. Specifically, the change in acoustic impedance causes incoming ultrasonic waves from surface 120 to reflect sharply and strongly off of boundary 150, which enables the depth of boundary 150 to be accurately and reliably measured.

Figure 2:
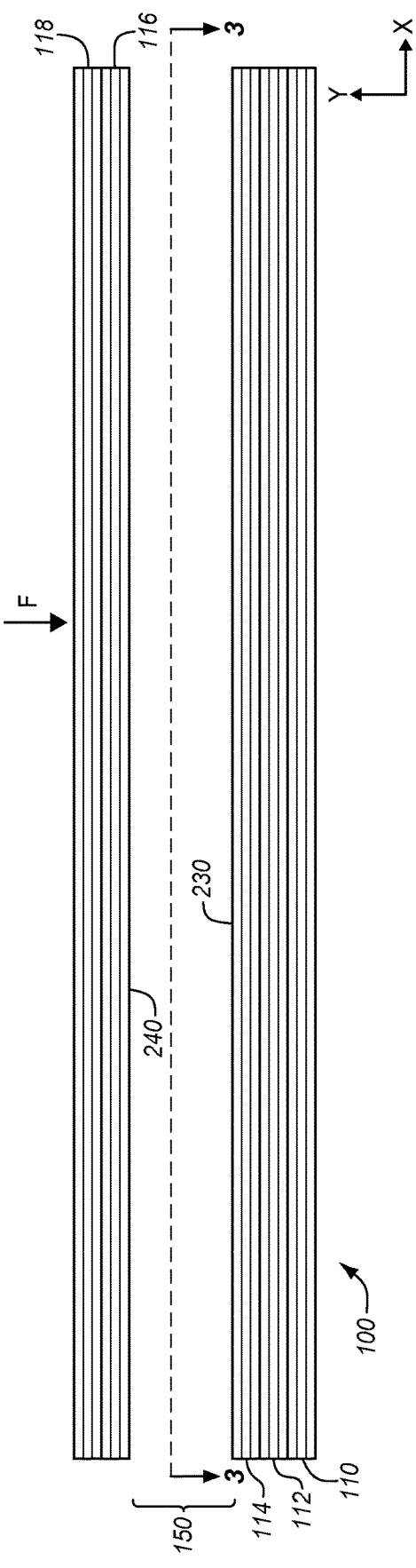

FIG. 2 is a partially exploded side view of composite part 100 in an exemplary embodiment. In this view, layers 114 and 116 have been separated in order to illustrate boundary 150 between these layers. In this case, boundary 150 is defined by surface 240 of layer 116 and surface 230 of layer 114, which are in contact despite their apparent separation in this exploded view. Boundary 150 may represent an intersection between layers of composite part 100 that is likely to exhibit an inconsistency, should an inconsistency exist in composite part 100. For example, boundary 150 may comprise an intersection between layers that has previously been determined to exhibit the greatest amount of inconsistency whenever an inconsistency exists within composite parts of the same design. In particular, boundary 150 may comprise an intersection between layers that may exhibit inconsistencies that are out of tolerance. Such a determination may be made by historical testing of similar composite parts, by Finite Element Modeling (FEM) of composite part 100 predicting locations where inconsistencies may be found, etc. Thus, these determinations and/or predictions may be facilitated by past experience in manufacturing composite structures in general as well as past experience pertaining to this particular design for a part.

As mentioned above, regions 170 have a substantially altered elastic modulus when compared with layers of composite part 100. For example, regions 170 may have comprise particles that have a much higher elastic modulus than matrix 162 and fiber 164 with respect to transverse force (F) applied to composite part 100, such as four to seventy-five times as high. In a further example, regions 170 may comprise a material that has a much lower elastic modulus than matrix 162 (e.g., on the order of Kilopascals (KPa) per square meter instead of Gigapascals (GPa) per square meter), or may even comprise small voids/pores at boundary 150 that have no definable elastic modulus. As used herein, a void/pore having no definable elastic modulus is considered to have an elastic modulus of zero. In any case, regions 170 alter the acoustic impedance of composite part 100 at boundary 150, which results in enhanced detection of the depth of boundary 150 within composite part 100. In embodiments where regions 170 comprise voids/pores, it may be desirable to carefully control void size and distribution.

Regions 170 occupy a small portion of boundary 150 (e.g., surface 230) per unit area. This ensures that overall bond strength between layer 114 and layer 116 is not substantially reduced and that interlaminar bond strength remains high (e.g., matrix 164 of resin is not substantially interfered with by the presence of regions 170). For example, regions 170 may occupy between one and ten percent per unit area of boundary 150. Individual regions 170 may be particularly small. For example, regions 170 may have a size that is based on the wavelength of ultrasound utilized to image composite part 100. Thus, it may be desirable for regions 170 to be as wide across as at least one quarter of the wavelength of ultrasound that will travel through composite part 100 during imaging. In an embodiment where fiber diameters range between five and seven micrometers, and fibers 164 are encased in a thermoplastic veil of between twenty and sixty micrometers, an individual region 170 may be less than forty micrometers across and placed directly into the thermoplastic veil. In further embodiments, regions 170 are utilized in place of a thermoplastic veil. In short, regions 170 are sized to facilitate non-destructive imaging of regions of interest within composite part 100 via ultrasound.

Figure 3:
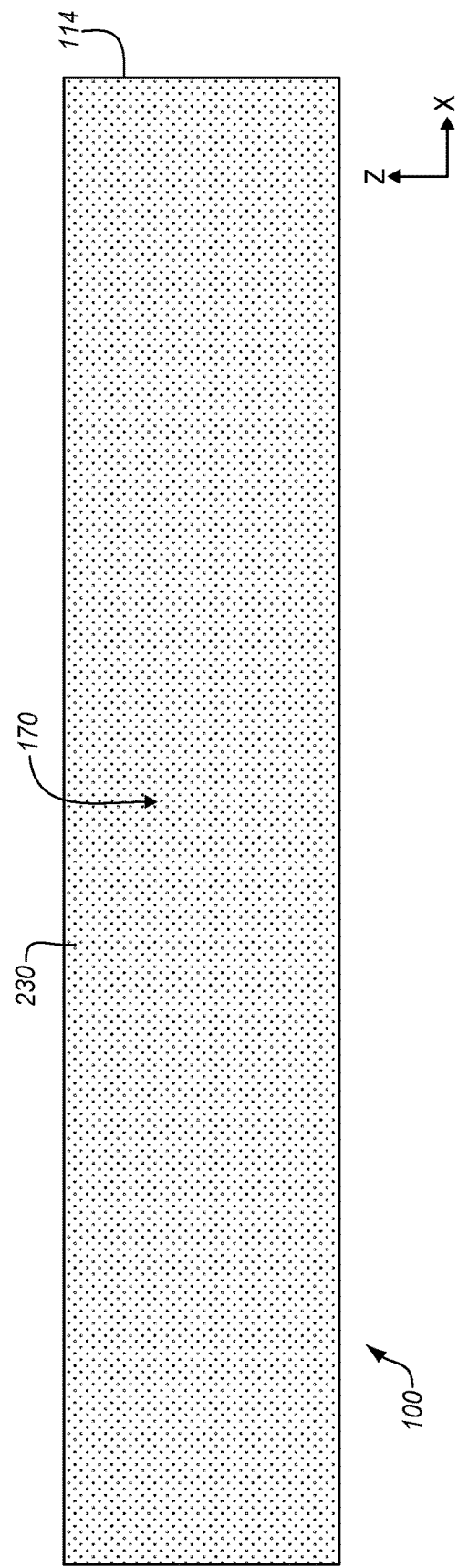

FIG. 3 is a view of surface 230 of layer 114 in an exemplary embodiment. Specifically, FIG. 3 corresponds with view arrows 3 of FIG. 2. In this embodiment, regions 170 are evenly and uniformly distributed/interspersed across surface 230, and are illustrated as small dots. While individual regions 170 may be located randomly, the density of regions 170 per unit area (e.g., per meter, per centimeter, per millimeter) remains uniform and/or constant.

Figure 1B:
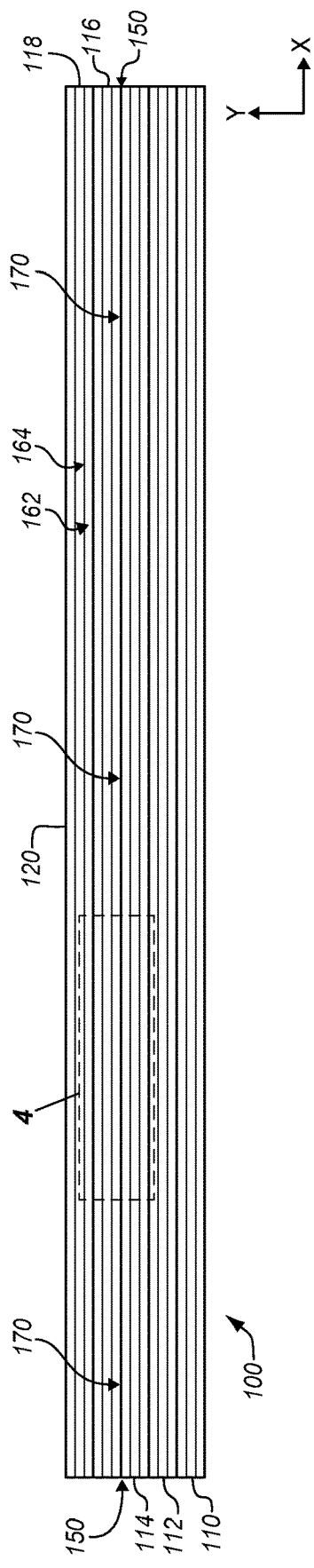
Figure 4:
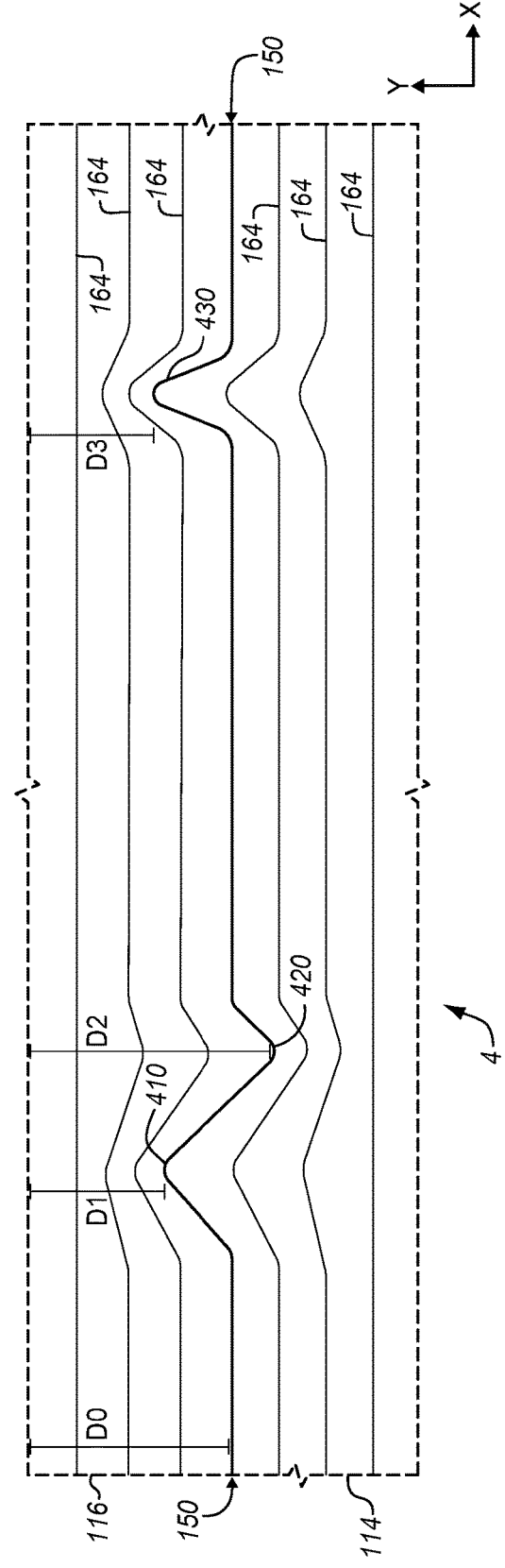

FIG. 4 is a zoomed-in view of area 4 of FIG. 1B. Both FIG. 4 and FIGS. 1-2 are therefore side views. FIG. 4 illustrates inconsistencies 410, 420, and 430 which may be hidden within area 4 where they cannot be visually inspected. Due to the inclusion of regions 170, inconsistencies 410, 420, and 430, which are located along boundary 150 between layer 116 and layer 114, will exhibit desirable imaging characteristics when analyzed via ultrasound. FIG. 4 further illustrates that fibers 164 within layer 114 and layer 116 may gradually diminish in magnitude of inconsistency as distance increases from boundary 150. In such circumstances, there may be no externally discernible details of these internal inconsistencies. Hence, the presence of such inconsistencies would be unknown without engaging in testing. As shown in FIG. 4, boundary 150 has an expected depth of D0, while inconsistency 410 has a depth of D1, inconsistency 420 has a depth of D2, and inconsistency 430 has a depth of D3. The changes in depth cause boundary 150 to be inconsistently located depthwise. This is one reason why they are referred to herein as "inconsistencies."

Because boundary 150 has been enhanced with regions 170, composite part 100 may be beneficially tested for inconsistencies via Non-Destructive Imaging (NDI) in the form of ultrasound imaging. This eliminates any need for destructive testing, which helps to preserve the structural integrity of composite part 100.

While a single (e.g., uncomplex) composite part has been illustrated and described that facilitates ultrasonic imaging, these principles also apply to complex composite parts, such as stringers, frames, ribs, and other support structure as well as skin panels of an aircraft. These principles further apply to environments where two laminates are co-cured (i.e., cured together into a single monolithic composite part). These principles also apply to environments where two composite parts are co-bonded (e.g., affixed to each other via epoxy). In some embodiments, it is particularly desirable to non-destructively scan the interior (e.g., non-visible) portions of composite part 100 to identify out of tolerance inconsistencies. Hence, regions 170 may be interspersed at one or more boundaries between layers. At the same time, it may not be beneficial to intersperse regions 170 into every boundary between layers, as composite parts may include hundreds of layers, and regions 170 may substantially attenuate ultrasonic waves. Thus, applying regions 170 at too many boundaries may prevent deep imaging of a composite part.

With a description of composite part 100 provided above, ultrasonic imaging of composite part 100 is discussed with regard to FIGS. 5-6. FIGS. 5-6 are diagrams illustrating an ultrasonic imaging system 500 in an exemplary embodiment. Ultrasonic imaging system 500 comprises any combination of devices and/or components capable of acquiring data points for an object/part (e.g., composite part 100) by inducing and/or detecting the oscillation of ultrasonic waves within that part. In this embodiment, ultrasonic imaging system 500 comprises generator 510 and signal processing unit 520. Generator 510 generates an ultrasonic wave 540 at an external surface 532 of part 100 as shown in FIG. 5. If generator 510 is implemented as an ultrasonic transducer, then wave 540 may be generated by physical vibration at generator 510. Alternatively, if generator 510 comprises a laser interferometer (e.g., a confocal dual cavity laser interferometer), then generator 510 may fire a laser beam 512 at part 100 to induce ultrasonic wave 540.

Ultrasonic wave 540 travels from surface 120 of part 100 through layers of part 100 and hits boundary 150. At boundary 150, regions 170 change the physical properties of part 100 (in particular, the elastic modulus). This results in a substantial change in acoustic impedance at boundary 150. That is, since regions 170 are dispersed (e.g., evenly and uniformly) across boundary 150, and since regions 170 have a substantially different elastic modulus than their surroundings, they change the acoustic impedance of boundary 150. This results in wave 540 attenuating and being reflected at boundary 150, which is shown as attenuated wave 640. Attenuated wave 640 then is detected by system 500 as shown in FIG. 6. In embodiments where generator 510 comprises a transducer, generator 510 may detect the return of an ultrasonic wave from boundary 150. In other embodiments, sensor 511 may be used for this purpose. In this embodiment, pulse-echo ultrasonic imaging is described. However, in further embodiments through-transmission ultrasonic imaging may be utilized. When engaging in through-transmission ultrasonic imaging, a pass-through attenuated wave may be detected instead of reflected attenuated wave 640. In further embodiments, regions 170 may be dispersed within one or more specific portions (e.g., areas) of boundary 150 that will be imaged via ultrasound, instead of being dispersed along the entirety of boundary 150. This enhances imaging of these specific portions.

Signal processing unit 520 analyzes data acquired by imaging system 500 in order to determine the depth (D) of boundary 150, which may change with the presence of inconsistencies at boundary 150. For example, signal processing unit 520 may detect a large change in amplitude (i.e., a large value for the derivative of amplitude) at a given point in time, and may calculate a depth of boundary 150 at a location based on this point in time. In this embodiment, signal processing unit 520 includes interface (I/F) 526 which retrieves signal data for attenuated wave 640 (e.g., a reflected version of an ultrasonic wave 540 induced via generator 510). Signal processing unit 520 further includes sensor 511 which detects induced ultrasonic waves, memory 524, which stores data acquired via I/F 526, and controller 522 which analyzes data maintained in memory 524. In further embodiments, signal processing unit 520 may be independently implemented from system 500 (e.g., as an independent computer). Surface 532 and material 534 are also depicted.

I/F 526 may comprise any suitable data interface, such as a wired data connection, or a wireless transceiver. Memory 524 may comprise any component configured to store data for retrieval, including for example Random Access Memory (RAM), flash memory, a hard disk, etc. Controller 522 may be implemented, for example, as custom circuitry, as a processor executing programmed instructions, or some combination thereof.

Further details of the operation of imaging system 500 will be described with regard to method 700 of FIG. 7. Assume, for this embodiment, that imaging system 500 is being operated by signal processing unit 520, and that part 100 has been placed proximate to imaging system 500 for analysis. Imaging system 500 will utilize ultrasonic techniques to image/scan part 100 at multiple locations (e.g., along X and/or Z), and will further review this data to determine whether the depth of boundary 150 remains consistent, or if inconsistencies exist.

Figure 7:
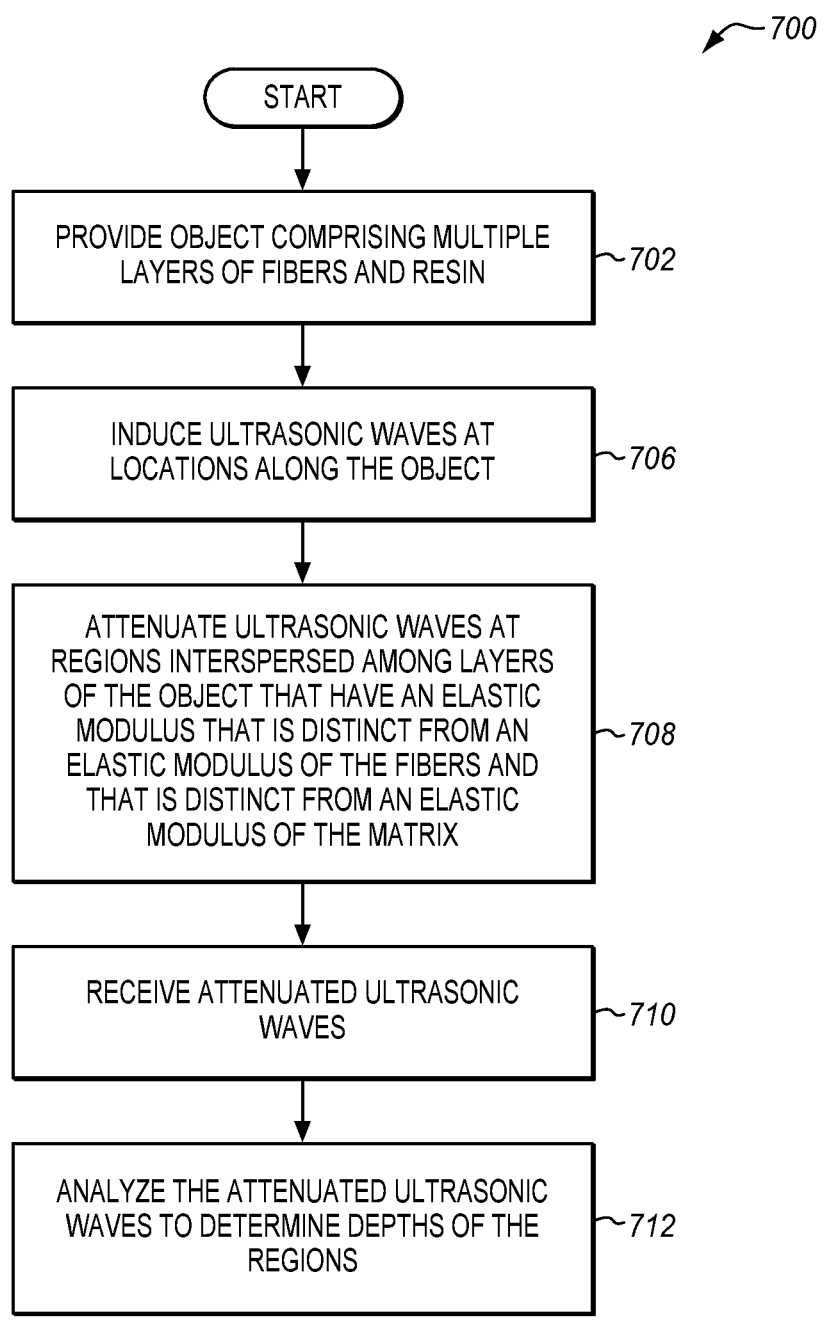
FIG. 7 is a flowchart illustrating a method of imaging an enhanced composite part via an ultrasonic imaging system in an exemplary embodiment.

FIG. 7 is a flowchart illustrating a method 700 for ultrasonic imaging in an exemplary embodiment. The steps of method 700 are described with reference to imaging system 500 of FIG. 5, but those skilled in the art will appreciate that method 700 may be performed in other systems as desired. The steps of the flowcharts described herein are not all inclusive and may include other steps not shown. The steps described herein may also be performed in an alternative order.

An object is provided which includes multiple layers of fibers and resin (step 702). For example, the object may comprise a laminate. The laminate may include a material that is distinct from (e.g., has a different elastic modulus than the fibers and resin, and/or is chemically distinct from) the fibers and the resin. As used herein, the term "chemically distinct" is used to describe substances having different chemical structures. The material may be strategically placed at a boundary between layers of the laminate, and even may be strategically placed at specific portions of the boundary if desired to facilitate ultrasonic imaging of those portions. The material may be added to the laminate, or may already be included in the laminate prior to the laminate being provided in step 702. Alternatively, the object may comprise a composite part 100 created by forming (e.g., curing or consolidating) the unhardened resin into matrix 162 of solid resin. The hardening process causes the material discussed above to form regions 170 interspersed among the layers of part 100 that have an elastic modulus that is distinct from an elastic modulus of fibers 164, and that is distinct from an elastic modulus of matrix 162. In one embodiment, the hardening of the laminate causes the material to change its elastic modulus, while in another embodiment, hardening of the laminate does not alter the elastic modulus of the material. Thus, the imaging techniques discussed herein may potentially be performed on (unhardened) laminates as well as on (hardened) composite parts. Identification of inconsistencies between layers (e.g., 114, 116) at the object (e.g., part 100) is initiated.

The object (e.g., part 100, or a laminate precursor thereof) is located within scanning range of imaging system 500. For example, the object may be placed directly below generator 510 of imaging system 500. Controller 522 directs generator 510 to induce/apply ultrasonic waves (e.g., ultrasonic wave 540) at surface 532 of the object (e.g., via Laser Ultrasound (LUT) or via an ultrasound transducer) (step 706). The generated wave 540 travels through material 534 towards boundary 150. Upon reaching boundary 150 between layer 114 and layer 116, wave 540 is attenuated (step 708). This is due to regions 170 interspersed within boundary 150 having an elastic modulus that is distinct from an elastic modulus of fibers 164, and that is also distinct from an elastic modulus of matrix 162 of resin (see FIG. 4). For example, regions 170 may have an elastic modulus that is twice as high (or even much higher, such as seventy-five times as high) as the elastic modulus of fibers 164 with respect to transverse force. In a further example, regions 170 may have an elastic modulus that is much lower (e.g., on the order of hundreds KPa) than an elastic modulus of fibers 164 (e.g., on the order of tens of GPa), or may even comprise voids with no measureable elastic modulus.

Attenuated wave 640 (e.g. a reflected wave) is received for detection by imaging system 500 (step 710). Controller 522 implements a detection process, such that incoming signaling is sampled over a period of time (e.g., one half of a second) during which attenuated ultrasonic wave 640 is expected to be received. That is, controller 522 may acquire a waveform representing ultrasonic wave 640 during the time period, the waveform including a plurality of data points (each data point having corresponding amplitude data for a point in time). Controller 522 may then process the plurality of data points to collect a data point that indicates amplitude data and time-of-flight data for boundary 150 (e.g., the highest change in value during the time period, the highest peak value during the time period, etc.). Thus, according to exemplary method 700, the collected/selected data point is utilized to determine a depth of boundary 150 at the current location. The data point may be stored in memory 524, and may be associated with the location on surface 230 that was scanned. In this manner, controller 522 may analyze received ultrasonic waves to determine depths of regions 170 (step 712). For example, controller 522 may determine depths of boundary 150 at various locations along composite part 100, based on a timing of received attenuated ultrasonic waves 642. The locations being analyzed may correspond with specific portions of boundary 150 at which regions 170 are placed.

Controller 522 further determines whether or not imaging/sampling/scanning of the object has been completed. For some parts, a resolution of many Pixels Per Inch (PPI) may be desired to scan the object along one or more axes. Thus, hundreds, thousands, or even millions of samples/data points may be acquired in order to form the image/scan. If not all data points have yet been acquired, controller 522 selects a new location on the object for scanning/imaging and resumes non-destructive imaging of the object. Alternatively, if enough samples/data points have been acquired for the scan, then the scan/image has been completed and may be presented to a user via a display (e.g., including a touchscreen user interface (not shown)) or other presentation device (e.g., speaker). If an inconsistency is detected, controller 522 may generate a notification indicating that the inconsistency is present, and/or that an inconsistency is out of a predefined tolerance limit in terms of size. The notification may further indicate a magnitude of the inconsistency. The user may then address and/or disposition the inconsistency as desired. For example, controller 522 may transmit an instruction to a display (not shown) that directs the display to present the notification to an operator of imaging system 500.

Figure 8:
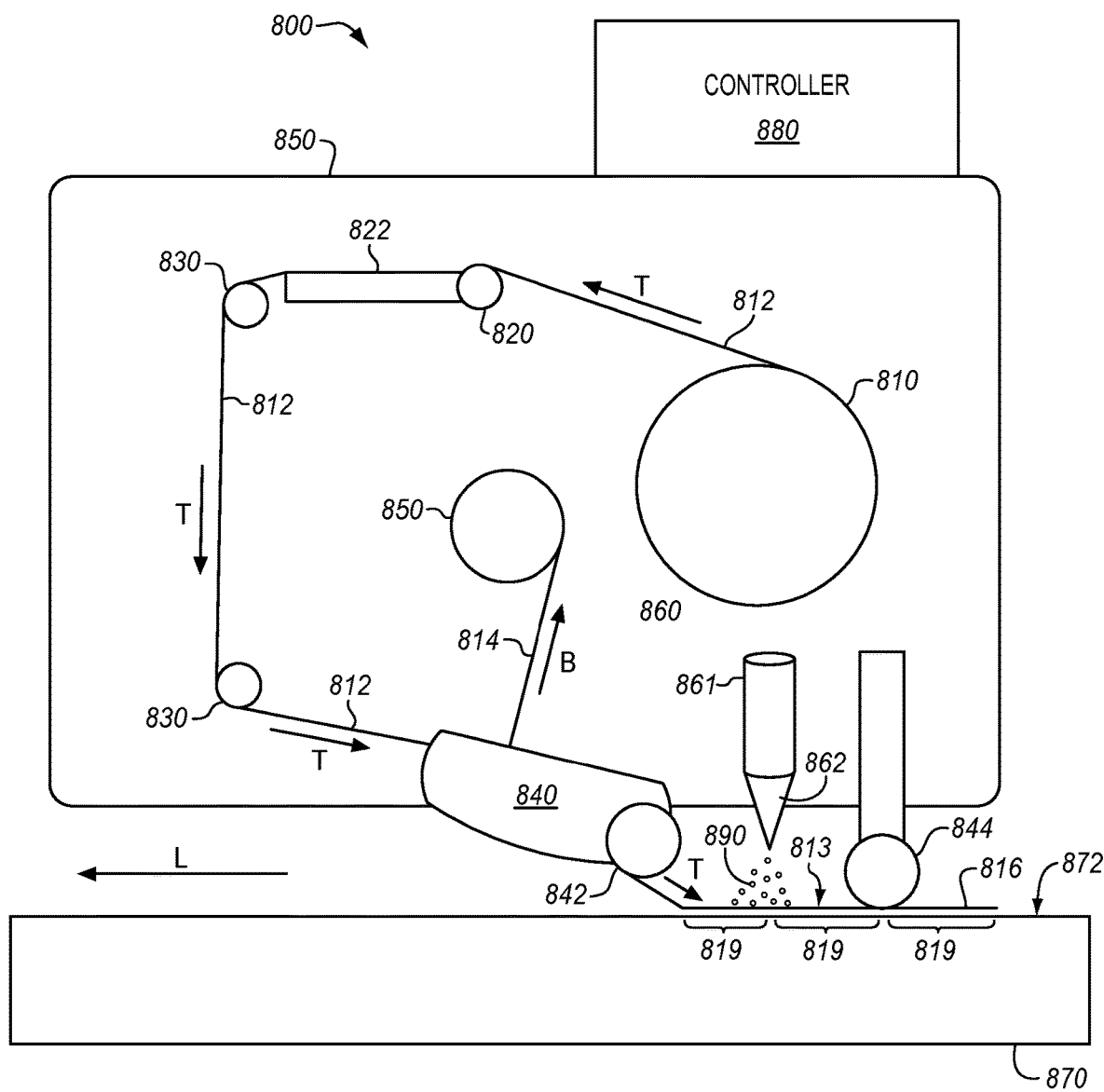
FIG. 8 is a diagram illustrating a Composite Tape Layup Machine (CTLM) that dispenses material between layers of a laminate in an exemplary embodiment.

With a variety of techniques and systems for imaging an enhanced composite part included above with regard to FIGS. 5-7, a discussion of systems and techniques for fabricating enhanced composite parts is now provided. FIG. 8 is a diagram illustrating a Composite Tape Layup Machine (CTLM) 800 that dispenses material 890 onto a surface 813 of a tape 812 that will form a boundary between layers of a laminate 816 in an exemplary embodiment. CTLM 800 may lay up multiple lengths of tape at once in a single "course," and may further lay up multiple courses in order to fabricate multiple/additional layers on top of laminate 816. In this embodiment, CTLM 800 includes spool 810, from which tape 812 is pulled by drive roller 820. Drive roller 820 is driven by drive mechanism 822 to draw tape 812 in direction T across guide rollers 830 and into head 840. After tape 812 enters head 840, backing 814 is removed, moved in direction B, and stored at take-up spool 850. Meanwhile, tape 812 is laid-up onto laminate 816. Laminate 816 is itself laid-up onto surface 872 of a forming tool 870 as head 840 proceeds along layup direction L. After tape 812 is laid-up but before compaction by compaction roller 844, dispenser 860 is operated to intersperse material 890 from reservoir 861 out through nozzle 862 and onto tape 812. Controller 880 directs the operations of the various components of CTLM 800 discussed above. Controller 880 may be implemented, for example, as custom circuitry, as a processor executing programmed instructions, or some combination thereof.

Because CTLM 800 fabricates laminates in an unhardened (e.g., uncured) state, material 890 dispensed by CTLM 800 may comprise any of a variety of substances. For example, in embodiments where laminate 816 will be hardened into a composite part 100 having embedded/interspersed regions that comprise particles, material 890 may comprise a powdered form of such particles. Material 890 may for example comprise nanoscale particles of forty micrometers of size and under (e.g., down to three to ten nanometers in size), and these particles may comprise aluminum, copper, other metals and/or metallic particles, glass, sapphire, or even powdered nanoparticles of diamond. Such particles may be sprayed onto tape 812 in combination with air, applied onto tape 812 in solution via a liquid that will dry out prior to curing, etc. Controller 880 of CTLM 800 may strategically place material 890 such that material 890 is not dispersed at every layer of laminate 816. In further embodiments, CTLM 800 may strategically place material 890 along specific portions 819 (e.g., lengthwise portions) of laminate 816 as desired.

In some embodiments, material 890 comprises a precursor liquid that will evaporate during the curing process of laminate 816, resulting in regions 170 that are pores. In such embodiments, dispenser 860 may dispense droplets between one and two micrometers in size (e.g., no more than three micrometers in size), which form during curing of laminate 816 into pores of sizes between twenty and forty micrometers. Such embodiments may involve dispensing the droplets to cover less than one percent of the surface area of tape 812, as the pores/voids resulting from such droplets may be an order of magnitude larger than the droplets themselves. A suitable precursor liquid may comprise an oil that evaporates close to the cure temperature (e.g., between twenty and zero degrees below the cure temperature). Suitable candidates for the precursor liquid comprise alkanes having between nine and fourteen carbon atoms, or other olefins.

In yet another embodiment, material 890 comprises a second resin (e.g., a liquid resin) having a higher cure temperature than a first resin within tape 812 that will form matrix 162. In such an embodiment, first resin within tape 812 may comprise an epoxy amine resin with a cure temperature of 350° Fahrenheit (F.), while the second resin (i.e., material 890) may comprise a benzoxazine resin or bismaleimide resin having a higher curing temperature (e.g., 500-650° F.). Laminate 816 may then be cured into a composite part at the lower temperature and imaged. At this temperature, material 890 does not vitrify/solidify. This means that material 890 remains viscoelastic while resin within tape 812 has vitrified. Thus, material 890 forms regions that are filled with uncured resin and therefore cause a change in acoustic impedance at laminate 816. Then, after imaging has been completed, the composite part may be re-cured if desired at the higher temperature as well, or material 890 may be left uncured at the composite part.

In further embodiments, tape 812 may be pre-coated with material 890 prior to storage on spool 810. In such embodiments, no dispenser is utilized and any suitable CTLM may lay up tape 812 to facilitate ultrasonic imaging of boundaries between layers of a composite part.

In a further embodiment, a method of inspecting a composite structure such as a laminate or composite part 100 includes laying up a composite structure of fibers and a matrix of resin to form the composite structure, and further includes interspersing, at one or more predetermined strategic locations (e.g., portions 819) within the composite structure, a material that is distinct from the fibers and the resin. Such materials may, for example, comprise material 890 of FIG. 8 discussed below. The method may further include interrogating the composite structure via ultrasound as discussed above, and imaging the one or more predetermined strategic locations of the material within the composite structure via the ultrasound inspection.

Figure 9:
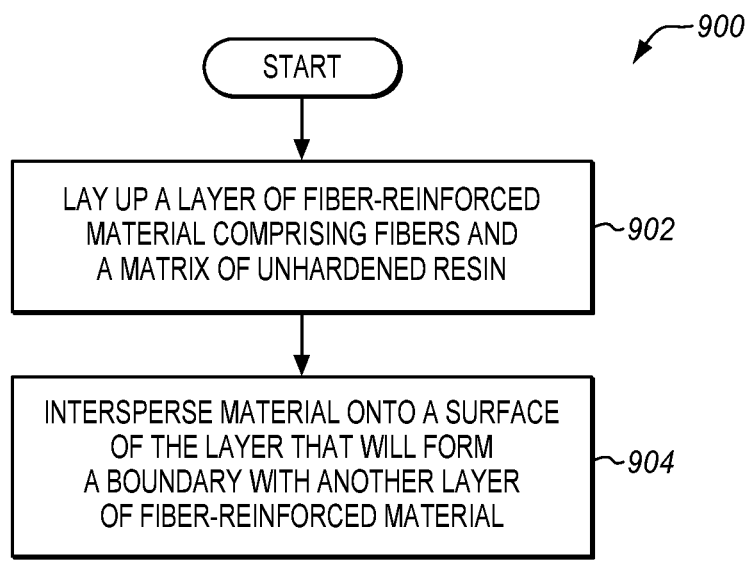
FIG. 9 is a flowchart illustrating a method of fabricating an enhanced composite part in an exemplary embodiment.

FIG. 9 is a flowchart illustrating a method 900 of fabricating an enhanced composite part in an exemplary embodiment. The steps of method 900 are described with reference to CTLM 800 of FIG. 8, but those skilled in the art will appreciate that method 900 may be performed in other fiber layup environments as desired.

According to FIG. 9, layer 114 of fiber reinforced material comprising fibers 164 and a matrix 162 of uncured resin is laid-up by head 840 of CTLM 800 (step 902). For example, layer 114 may comprise a portion of laminate 816, wherein each layer contacts another layer within laminate 816. In a further example, layer 114 is a portion of uncured pre-impregnated ("pre-preg") CFRP that will be placed onto a roll for later use during layup. CTLM 800 intersperses material 890 onto surface 813 of layer 114 (step 904). As shown in FIG. 1B, layer 114 will define half of a boundary 150 between layers where an inconsistency may form when integrated into a laminate, such as laminate 816. Thus, controller 880 directs dispenser 860 to intersperse material 890 onto layer 114 (step 904). The application of material 890 may be performed strategically based on input from controller 880. Controller 880 may for example adjust an amount of air pressure applied to dispenser 860, and or a size of nozzle 862, in order to achieve a desired rate of mass flow (and distribution of) material 890 across layer 114. Material 890 forms regions 170, which, after curing, will occupy between one and ten percent of a surface area of layer 114, and which will exhibit a substantially different modulus of elasticity than that found in layer 114 after curing. In this manner, layers (or entire laminates) of material may facilitate NDI by providing an enhanced level of visibility when scanned.

In further embodiments, material 890 may be accompanied by other materials that form regions 170. These other materials may be chemically distinct from material 890 and/or have a different modulus of elasticity than material 890. Hence, some regions 170 may have different elastic moduli than each other. In this manner, regions 170 may exhibit multiple different elastic moduli that are each distinct from an elastic modulus of the fibers and distinct from an elastic modulus of the matrix. In one exemplary implementation of this concept, regions 170 at a first portion 819 of layer 114 may exhibit a first shared elastic modulus owing to material 890 (e.g., diamond), while regions 170 at a second portion 819 of layer 114 (or even an entirely different layer) may exhibit a second shared elastic modulus owing to use of a different material (e.g., sapphire, a different type of resin, or even a void). Both of the shared elastic moduli are different from the elastic modulus of the fibers and the elastic modulus of the matrix.

EXAMPLES

In the following examples, additional processes, systems, and methods are described in the context of fabrication environment for fabricating and/or imaging enhanced composite parts. The example will be described with respect to the systems and devices of FIG. 10.

Figure 10:
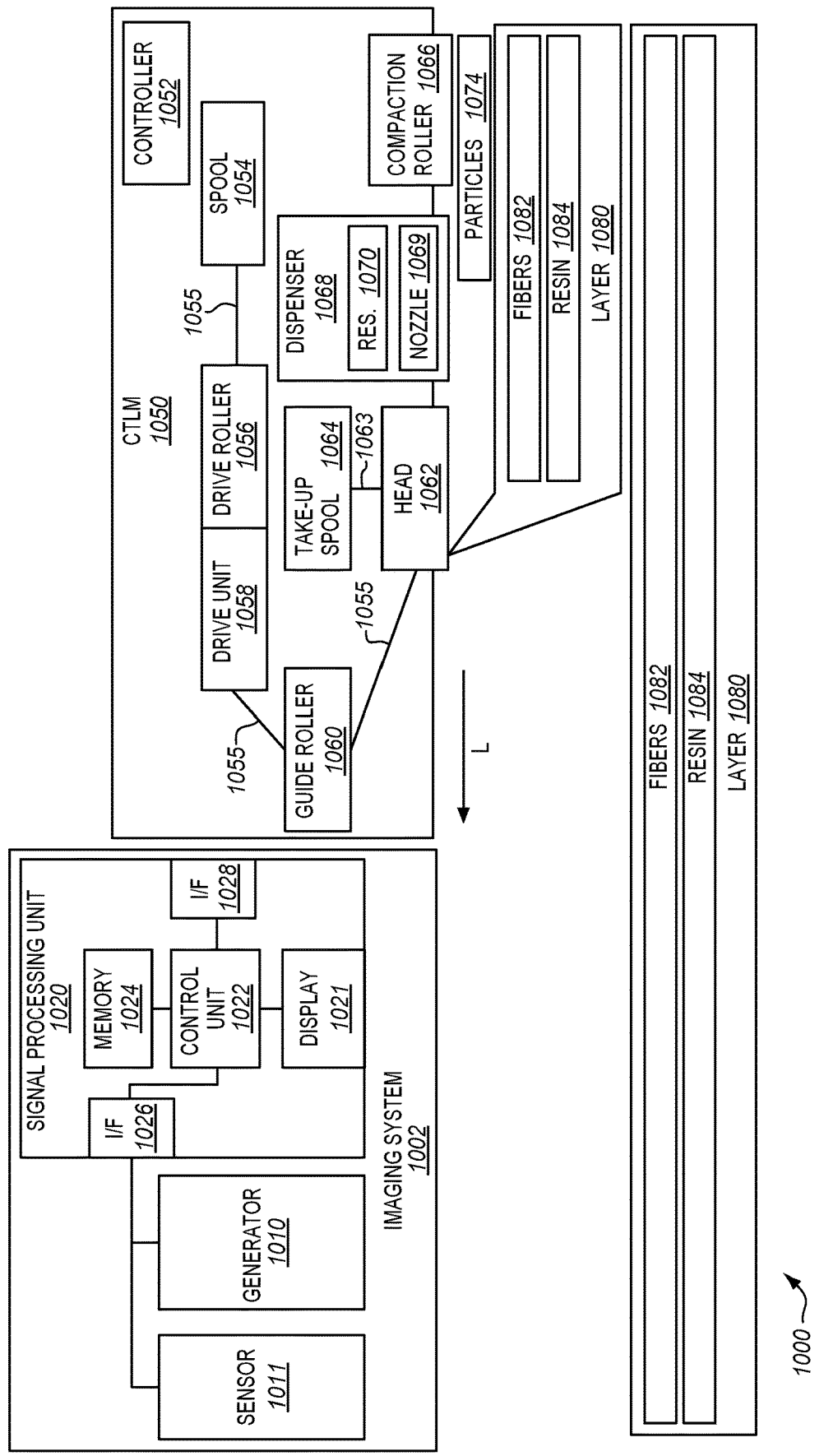
FIG. 10 is a block diagram of a fabrication environment for enhanced composite parts in an exemplary embodiment.

FIG. 10 is a block diagram of a fabrication environment 1000 for enhanced composite parts in an exemplary embodiment. Fabrication environment 1000 includes an imaging system 1002, which includes ultrasonic wave generator 1010, sensor 1011, and signal processing unit 1020. Signal processing unit 1020 includes backend interface 1026 (e.g., an internal computer bus, Universal Serial Bus (USB), etc.) for providing instructions to generator 1010. Signal processing unit 1020 also includes frontend interface 1028 (e.g., an Ethernet connection) through which reports may be transmitted, and display 1021 (e.g., a screen) for displaying data to a user. Control unit 1022 controls the operations of imaging system 1002. FIG. 10 further illustrates layers 1080, which are being laid-up by CTLM 1050. Each layer 1080 includes resin 1084, as well as fibers 1082.

CTLM 1050 includes controller 1052, which manages the operations of CTLM 1050. Carbon fiber tape 1055 is removed from spool 1054 via drive roller 1056, which is driven by drive unit 1058. Tape 1055 continues via guide roller 1060 until reaching head 1062. Head 1062 parts backing 1063 from tape 1055, and stores the backing on take-up spool 1064. Head 1062 also uses tape 1055 to lay up a layer 1080 along layup direction L. After layer 1080 is place by head 1062 but before compaction of layer 1080 by compaction roller 1066, dispenser 1068 applies particles 1074 to layer 1080. In further embodiments, particles 1074 may be applied at head 1062, or at other upstream or downstream locations as desired. Specifically, particles 1074 are removed from reservoir 1070 and ejected via nozzle 1069.

Figure 11:
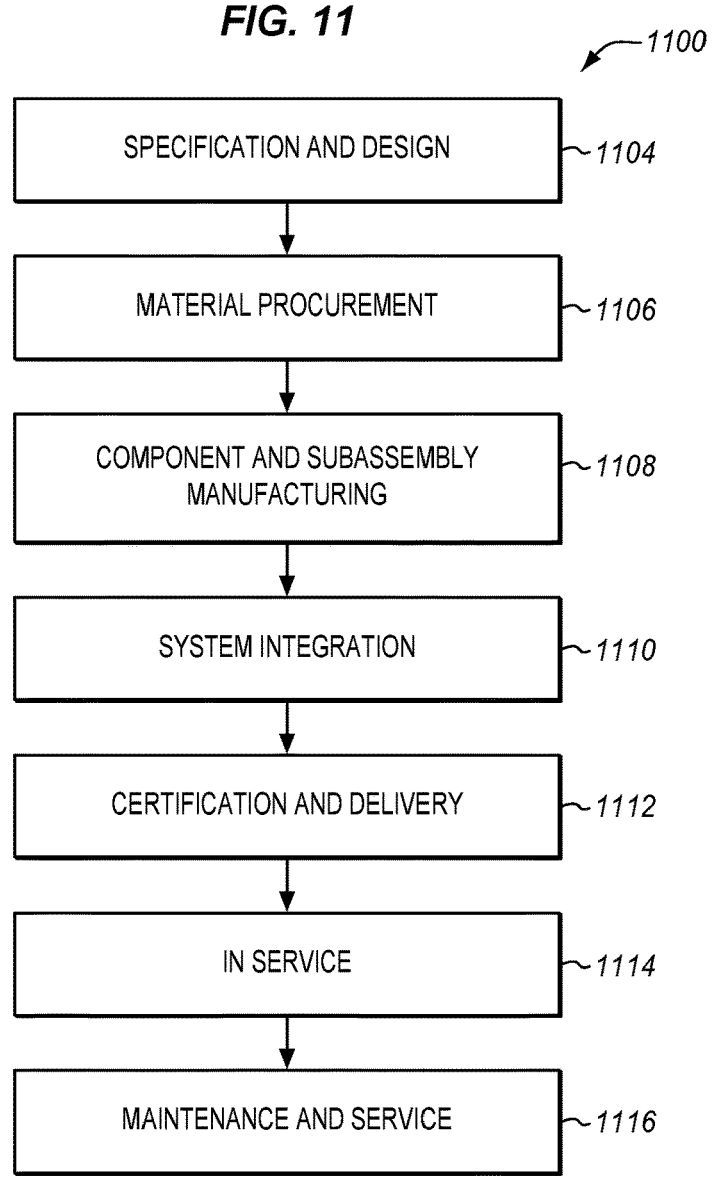
FIG. 11 is a flow diagram of aircraft production and service methodology in an exemplary embodiment.
Figure 12:
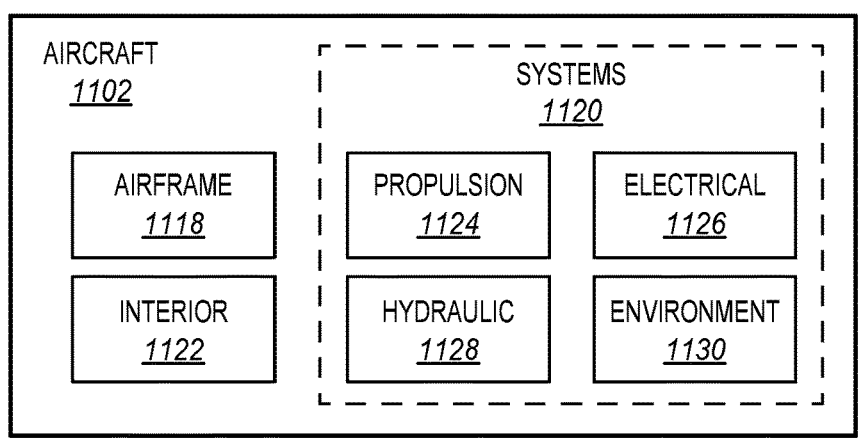
FIG. 12 is a block diagram of an aircraft in an exemplary embodiment.

Referring more particularly to the drawings, embodiments of the disclosure may be described in the context of an aircraft manufacturing and service method 1100 as shown in FIG. 11 and an aircraft 1102 as shown in FIG. 12. During pre-production, exemplary method 1100 may include specification and design 1104 of the aircraft 1102 and material procurement 1106. During production, component and subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine maintenance and service 1116 (which may also include modification, reconfiguration, refurbishment, and so on).

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 1102 produced by exemplary method 1100 may include an airframe 1118 with a plurality of systems 1120 and an interior 1122. Examples of high-level systems 1120 include one or more of a propulsion system 1124, an electrical system 1126, a hydraulic system 1128, and an environmental system 1130. Any number of other systems may be included. Although an aerospace example is shown, the principles of the invention may be applied to other industries, such as the automotive industry.

Apparatus and methods embodied herein may be employed during any one or more of the stages of the production and service method 1100. For example, components or subassemblies corresponding to production stage 1108 may be fabricated or manufactured in a manner similar to components or subassemblies produced while the aircraft 1102 is in service. Also, one or more apparatus embodiments, method embodiments, or a combination thereof may be utilized during the production stages 1108 and 1110, for example, by substantially expediting assembly of or reducing the cost of an aircraft 1102. Similarly, one or more of apparatus embodiments, method embodiments, or a combination thereof may be utilized while the aircraft 1102 is in service, for example and without limitation, to maintenance and service 1116. For example, the techniques and systems described herein may be used for steps 1106, 1108, 1110, 1114, and/or 1116, and/or may be used for airframe 1118 and/or interior 1122.

In one embodiment, enhanced composite parts comprise a portion of airframe 1118 (e.g., a wing), in order to ensure that these parts meet with quality standards before, after, or during component and subassembly manufacturing 1108. For example, composite part 100 may be assembled into an aircraft in system integration 1110, and then be utilized in service 1114 until wear renders part 1130 unusable. An imaging system 1002 may be utilized for example to ensure that part 100 continues to conform with quality standards. Then, in maintenance and service 1116, part 100 may be discarded and replaced with a newly manufactured part 100. Thus, imaging system 1002 may be utilized again in order to ensure that the new part 100 meets quality standards.

Any of the various control elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method comprising:
   laying up a layer of fiber-reinforced material comprising fibers and a matrix of unhardened resin;
   spraying material that is distinct from the fibers and the matrix onto a surface of the layer;
   compacting the layer and the material; and
   laying up an additional layer of fiber-reinforced material onto the material after compacting the layer and the material.

2. The method of claim 1 wherein:
   the material is distinct from the fibers and the matrix in that it has a different elastic modulus than the fibers and the matrix.

3. The method of claim 1 wherein:
   the material is distinct from the fibers and the matrix in that it is chemically distinct from the fibers and the matrix.

4. The method of claim 1 wherein:
   spraying the material comprises dispensing particles having an elastic modulus that is higher than an elastic modulus of the fibers.

5. The method of claim 1 wherein:
spraying the material comprises dispensing particles that cover between one and ten percent of an area of the surface.

6. The method of claim 1 wherein:
spraying the material comprises dispensing particles along specific portions of the layer that will be imaged via ultrasound.

7. The method of claim 1 wherein:
spraying the material comprises dispensing aluminum.

8. The method of claim 1 wherein:
the material is interspersed at a first portion of the of the fiber-reinforced material, thereby forming regions having a first shared elastic modulus distinct from the fibers and distinct from the matrix of resin, and the method further comprises:
spraying another material at a second portion of the fiber-reinforced material, thereby forming regions having a second shared elastic modulus distinct from the fibers and distinct from the matrix of resin.

9. The method of claim 1 wherein:
dispensing the material is selectively applied to lengthwise portions of the surface.

10. The method of claim 1 further comprising:
adjusting an amount of air pressure applied during the spraying, based on a desired rate of mass flow of the material.

11. The method of claim 1 further comprising:
adjusting a size of a nozzle that performs the spraying, based on a desired rate of mass flow of the material.

12. The method of claim 1 wherein:
the material comprises nanoscale particles of forty micrometers of size and under.

13. The method of claim 12 wherein:
the material comprises nanoscale particles of between three and ten nanometers in size.

14. The method of claim 1 wherein:
laying up is performed by a head of a Composite Tape Layup Machine (CTLM); and
spraying is performed by a dispenser at the CTLM.

15. The method of claim 14 wherein:
the spraying is initiated after the laying up is initiated by the CTLM, and the spraying is initiated prior to initiating compaction by the CTLM.

16. The method of claim 1 wherein:
the compacting is performed via a compaction roller.

17. The method of claim 1 wherein:
the spraying is initiated before an entirety of the layer is laid-up.

18. The method of claim 1 wherein:
the material comprises particles that are applied in solution onto the surface.

19. The method of claim 1 wherein:
the material is sprayed onto the surface in combination with air.

20. The method of claim 1 wherein:
the layer of fiber reinforced material comprises Carbon Fiber Reinforced Polymer (CFRP).

* * * * *